Figure 1:
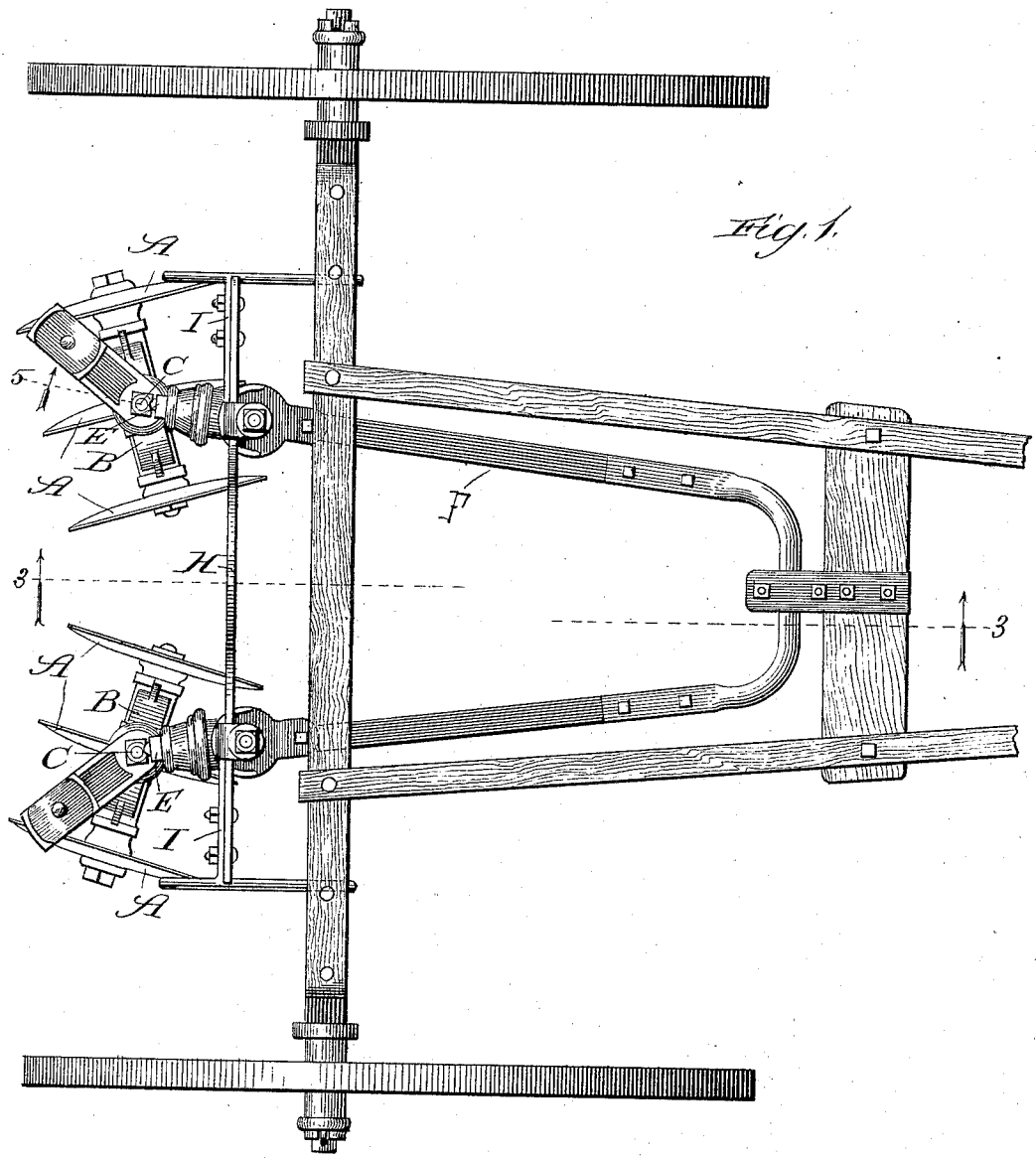

(No Model.)

S. C. COBB.
CULTIVATOR.

No. 436,472.

3 Sheets—Sheet 1.

Patented Sept. 16, 1890.

Witnesses:
Chas. E. Gaylord,
Clifford N. White.

Inventor:
Samuel C. Cobb,
By Banning & Banning & Payson
Att'ys.

(No Model.)
S. C. COBB.
CULTIVATOR.
No. 436,472.
3 Sheets—Sheet 2.
Patented Sept. 16, 1890.
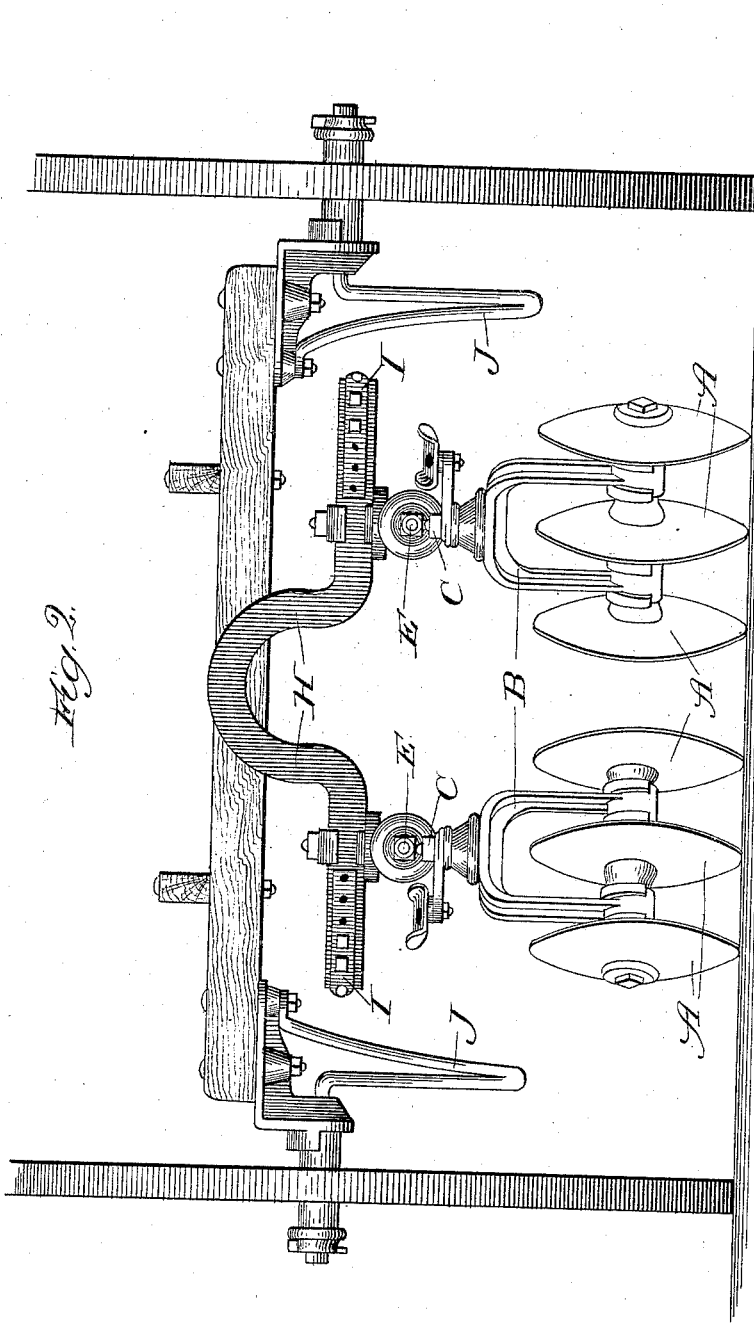
Witnesses:
Chas. E. Gayford,
Clifford N. White.
Inventor:
Samuel C. Cobb,
By Binning & Binning,
Attys.

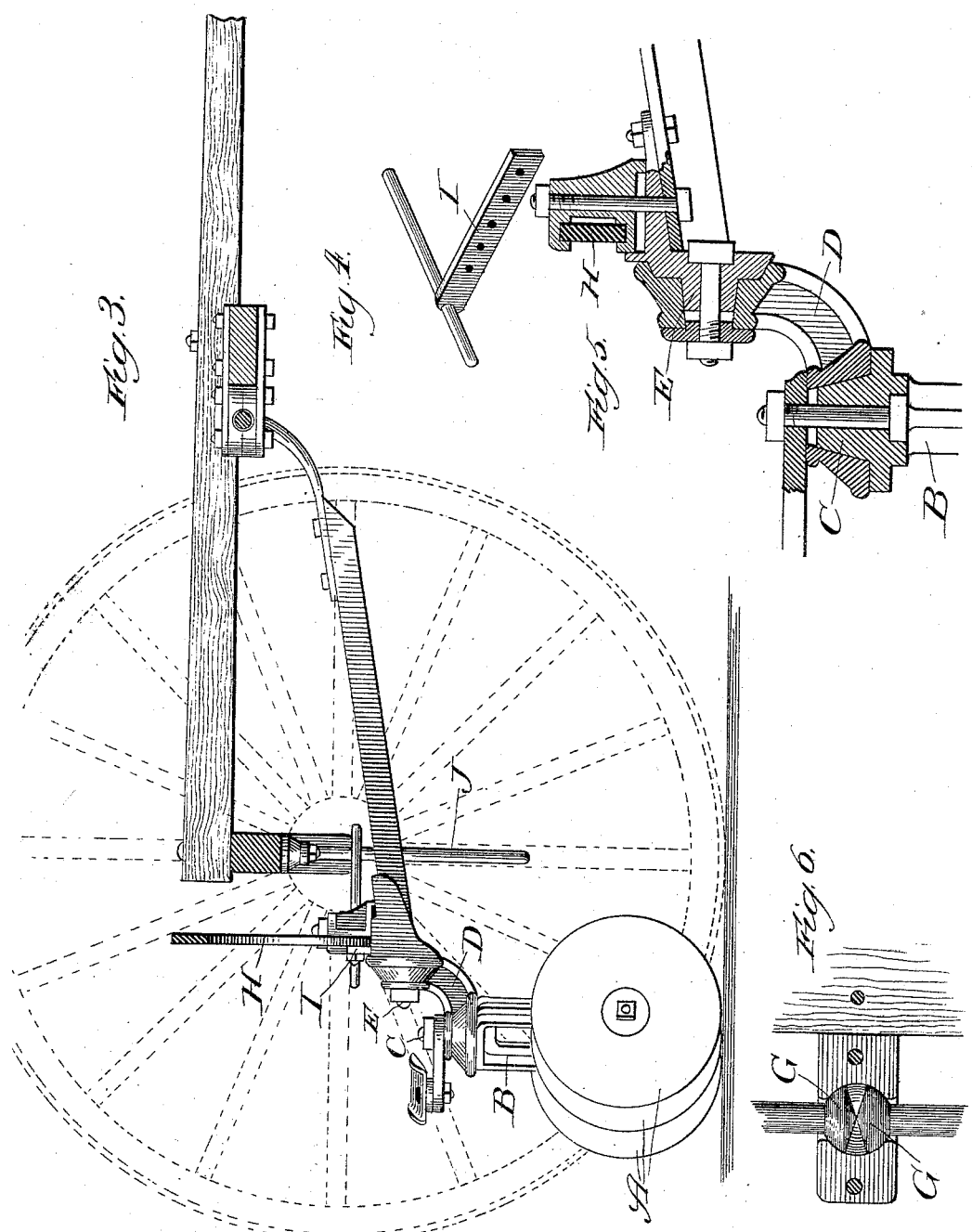

UNITED STATES PATENT OFFICE.

SAMUEL C. COBB, OF JANESVILLE, WISCONSIN.

CULTIVATOR.

SPECIFICATION forming part of Letters Patent No. 436,472, dated September 16, 1890.

Application filed March 19, 1889. Serial No. 303,866. (No model.)

*To all whom it may concern:*

Be it known that I, SAMUEL C. COBB, a citizen of the United States, residing at Janesville, Rock county, Wisconsin, have invented certain new and useful Improvements in Cultivators, of which the following is a specification.

The object of my invention is to make a cultivator to be used more particularly for the cultivation of corn, in which the disks, which are used instead of shovels, may be conveniently adjusted at different angles and so as to throw the soil toward or from the row and to secure other advantages, which will be described hereinafter; and my invention consists in the features and details of construction hereinafter described and claimed.

In the drawings, Figure 1 represents a plan view of my improved cultivator; Fig. 2, a rear elevation thereof; Fig. 3, a vertical section on the line 3 3 of Fig. 1, looking in the direction of the arrows; Fig. 4, a perspective view of one of the adjustable extension-pieces; Fig. 5, a vertical section on the line 5 of Fig. 1, and Fig. 6 a plan view of one of the ball-bearings with the upper half of the socket removed.

In making my improved cultivator I make the wheels, the axle, the tongue, and various other parts as they are commonly made in the construction of cultivators. Instead of shovels, I employ disks A, similar to those used in disk harrows. I mount these disks in gangs with preferably three disks in each set. The separate disks of each set are mounted on a common axle and are arranged at a proper distance apart. I prefer to set them about six inches apart, although the particular distance apart of the disks is a matter that may be varied to suit the circumstances of different cases. I loosely mount on the axles between the disks U-shaped yokes B, with the U high enough to easily include the middle disks. These yokes are provided at the top with vertical spindles or bearings C. Placed on these vertical bearings are arranged coupling-arms D, which extend forward and upward so that their forward ends will be preferably slightly above the vertical bearings on which their rear ends are arranged.

Horizontal bearings E fit on the rear ends of draft-bars F into the horizontal journals of the coupling-arms, and the draft-bars extend forward to a point where they are attached, preferably, to a cross-bar on the tongue. In this way I connect the draft-bars and the disk-gangs by means of coupling-arms, forming with them both vertical and horizontal joints.

The draft-bars are preferably made at their forward ends with curved forms terminating in half-balls G, which are preferably cut away on their end so as to present a bearing and protruding surface at their centers. The half-balls on the two draft-bars are similarly formed, so that when the two are placed together in the socket which is intended to contain them they will bear against each other only along their center lines, and thus be capable of adjustment, so that the draft-bars may be placed closer together or wider apart, as circumstances may render advisable. The form and arrangement of these half-balls and the socket in which they are contained will be apparent from an examination of the drawings.

Extending across the draft-bars and preferably near their rear ends is arranged a transverse arch H, which is intended to be bolted or otherwise secured to the draft-bars, so as to hold them the distance apart at which they may be adjusted.

In the drawings I have shown the arch as fastened to the draft-bars by means of a piece which clasps or clamps it, so that by loosening the nuts shown in the drawings the draft-bars may be moved laterally out or in to the desired point, when by turning the nuts they will be secured in their position, although other means, as above suggested, may be used to fasten the arch to the draft-bars. The outer ends of the arch are provided with adjustable extension-pieces I, with holes in them to enable them to be adjusted out or in on the ends of the arch and held in the desired position by bolts. Of course, instead of holes, a slot may be used, if preferred. These pieces are preferably provided with T-shaped ends, as shown in the drawings, and depending from the axle on the inside of the wheels are preferably arranged guards J, against which the T-shaped ends on the adjustable pieces may strike to prevent the arch, and with it the draft-bars and the disks, from being moved or thrown too great a distance to one side or the other. If desired, the adjustable pieces may be fastened in that position, which will bring their T-shaped ends into contact with the guards, and thus the disks fixed in a constant position so far as lateral play is concerned. It will be obvious that these guards may be cast integral with the casting to which the wheel-spindles are connected, and the ends of the arch may also be cast with T-shaped pieces when lateral adjustment is not desired, or the pieces which come into contact with the guards may be formed as a part of or attached to the draft-bars, if preferred. I prefer, however, to arrange them as shown in the drawings, as I am then able to make such changes in adjustment as circumstances may make desirable. These parts thus constitute fenders or guards to prevent the disks from being moved too much to one side, and when the T-shaped extensions or pieces are made adjustable they furnish means for changing the extent of lateral movement permitted to the disks.

I prefer to arrange on the vertical bearings rising from the U-shaped pieces mounted on the disk-axles arms or foot-rests extending out therefrom, as shown in the drawings. These arms enable the driver by bearing on them to change the position of the disks, as it may be desirable to move them toward the one wheel or the other. In that case the draft-bars are swung on their common center, where the half-balls are held in their socket. When it is desired to change the angle of the disks so that they slant out or in, the nuts on the horizontal bearings connecting the coupling-arms to the rear ends of the draft-bars are loosened and the proper adjustment made, when the nuts are again tightened to hold the disks in their new position. When it is desired to turn the disks around so that they will throw the dirt in an opposite direction, the nuts on the vertical bearings connecting the disks to the rear ends of the coupling-arms are loosened and the disks swung around so that their concave sides will face the other direction, when the nuts are again tightened to hold them in their new position. In this way and by means of these two bearings, the one vertical and the other horizontal, I am enabled to adjust the disks at any desired angle and to direct the dirt toward or from the row.

Of course it will be understood that the cultivator is provided with the usual raising-levers and with a seat for the driver in proper and convenient position to enable his feet to rest on the foot-rests above described, and that the disks are provided with proper scrapers to keep them clean; but I have not considered it necessary to illustrate these and other common features in the drawings.

What I regard as new, and desire to secure by Letters Patent, is—

1. In a cultivator, the combination of disk-gangs, draft-bars, and half-balls on the forward ends of the draft-bars fitting together in a common socket or bearing, substantially as described.

2. In a cultivator, the combination of disk-gangs, draft-bars, and coupling-arms extending forward and upward connecting the disk-gangs and the draft-bars, substantially as described.

3. In a cultivator, the combination of disk-gangs, draft-bars, and coupling-arms connecting the disk-gangs and the draft-bars through means of vertical joints in the rear ends and horizontal joints in the front ends of the coupling-arms, substantially as described.

4. In a cultivator, the combination of disk-gangs, draft-bars, and guards and extensions for adjusting the extent of lateral movement permitted to the disks, substantially as described.

SAMUEL C. COBB.

Witnesses:
   THOMAS A. BANNING,
   SAMUEL E. HIBBEN.